(12) United States Patent
McClung et al.

(10) Patent No.: US 9,728,942 B2
(45) Date of Patent: Aug. 8, 2017

(54) PORTABLE RACKING DEVICE FOR DRAW-OUT POWER CIRCUIT BREAKERS

(71) Applicant: MarTek Limited, Charleston, WV (US)

(72) Inventors: Charles Mark McClung, Elkview, WV (US); Russell Richard Safreed, III, Saint Albans, WV (US)

(73) Assignee: MARTEK LIMITED, Charleston, WV (US)

( * ) Notice: Subject to any disclaimer, the term of this patent is extended or adjusted under 35 U.S.C. 154(b) by 293 days.

(21) Appl. No.: 14/790,265

(22) Filed: Jul. 2, 2015

(65) Prior Publication Data

US 2016/0013000 A1    Jan. 14, 2016

Related U.S. Application Data

(60) Provisional application No. 62/021,841, filed on Jul. 8, 2014.

(51) Int. Cl.
| | |
|---|---|
| *H01H 71/02* | (2006.01) |
| *H04N 7/18* | (2006.01) |
| *H01H 69/00* | (2006.01) |
| *H02B 11/02* | (2006.01) |
| *H02B 3/00* | (2006.01) |

(52) U.S. Cl.
CPC ............ *H02B 11/02* (2013.01); *H02B 3/00* (2013.01)

(58) Field of Classification Search
USPC .......................................... 200/50
See application file for complete search history.

(56) References Cited

U.S. PATENT DOCUMENTS

| | | | |
|---|---|---|---|
| 5,453,587 A | 9/1995 | Hurley et al. | |
| 5,477,017 A * | 12/1995 | Swindler ............ | H02B 11/127 200/50.24 |
| 6,777,627 B1 | 8/2004 | Stevenson et al. | |
| 6,897,388 B2 | 5/2005 | Greer | |
| 6,951,990 B1 * | 10/2005 | Miller ................ | H02B 11/127 200/50.21 |
| 8,164,875 B1 | 4/2012 | Ledbetter et al. | |
| 8,304,672 B2 | 11/2012 | Lee et al. | |
| 8,395,065 B2 | 3/2013 | Zylstra et al. | |
| 8,553,394 B2 | 10/2013 | Hawkins et al. | |

* cited by examiner

*Primary Examiner* — Andy Rao
*Assistant Examiner* — Tyler Edwards
(74) *Attorney, Agent, or Firm* — Thomas | Horstemeyer, LLP (57) ABSTRACT

Disclosed are various embodiments for racking a draw-out circuit breaker. A portable motorized racking device may be connected or disconnected from an racking assembly of the circuit breaker. The portable racking device includes a gearmotor, a drive socket for engaging with the racking screw of the circuit breaker, and a locking disk for securing the portable racking device to the racking assembly of the circuit breaker. The gearmotor may be remotely controlled to rack the draw-out circuit breaker.

20 Claims, 9 Drawing Sheets

PORTABLE RACKING DEVICE FOR DRAW-OUT POWER CIRCUIT BREAKERS

CROSS-REFERENCE TO RELATED APPLICATIONS

This application claims priority to U.S. Provisional patent application titled "PORTABLE RACKING DEVICE FOR DRAWOUT CIRCUIT BREAKERS," filed on Jul. 8, 2014 and assigned application No. 62/021,841, which is incorporated by reference herein in its entirety.

FIELD OF THE INVENTION

The present disclosure generally relates to the racking of draw-out power air circuit breakers that have a racking mechanism and are operated by rotating a screw mechanism.

BACKGROUND

In larger power systems, a typical draw-out circuit breaker is connected or disconnected from the energized bus for maintenance or repair by a human operator who physically rotates a racking screw in order to connect or disconnect the breaker from the electrical supply bus. In order to effect the operation described above, a human operator must stand within arms-reach of the circuit breaker, which also means he or she is in close proximity to the circuit breaker. If the circuit breaker should happen to fail catastrophically, the human operator is at risk of serious injury or death from the resulting arc-blast and flying debris.

SUMMARY

Included are apparatuses, systems, and methods for a portable racking device for draw-out circuit breakers. One embodiment of an apparatus, among others, includes a portable racking device, comprising: a gearmotor comprising a gear box coupled to a motor; a drive socket coupled to an output shaft of the gearmotor, the drive socket sized to engage with a racking screw of a circuit breaker racking assembly; an angled bracket coupled to the gearmotor, the drive socket situated within a hole of a first member of the angled bracket, and a second member of the angled bracket configured to engage with a support angle of the circuit breaker racking assembly; and a locking disk moveably attached to the gearmotor, the angled bracket being disposed between the locking disk and the gearmotor, and the locking disk moveable about an axis of the output shaft of the gearmotor.

Another embodiment of an system, among others, includes a racking device system, comprising: a portable racking device detachably attached to a circuit breaker racking assembly of a circuit breaker, the portable racking device comprising: a gearmotor; a drive socket coupled to an output shaft of the gearmotor, the drive socket being engaged with a racking nut of the circuit breaker racking assembly; and a locking disk moveably attached to the gearmotor and situated in a locked position, a portion of the locking disk overlapping a circuit breaker racking assembly support angle of the circuit breaker racking assembly; and a control device in data communication with the portable racking device.

Another embodiment of a method, among others, includes a method of remotely racking a circuit breaker, the method comprising: aligning a drive socket of a portable racking device with a circuit breaker racking assembly of the circuit breaker; pushing a sliding breaker interlock of the circuit breaker racking assembly to expose a racking screw of the circuit breaker racking assembly; engaging the drive socket of the portable racking device with the racking screw; and securing the portable racking device to a support angle of the circuit breaker racking assembly.

Other embodiments, systems, methods, features, and advantages of this disclosure will be or will become apparent to one with skill in the art upon examination of the following drawings and detailed description. It is intended that all such additional apparatuses, methods, features, and advantages be included within this description and be within the scope of the present disclosure.

BRIEF DESCRIPTION OF DRAWINGS

Many aspects of the present disclosure can be better understood with reference to the following drawings. The components in the drawings are not necessarily to scale, emphasis instead being placed upon clearly illustrating the principles of the present disclosure. Like reference numerals designate corresponding parts throughout the several views.

DETAILED DESCRIPTION

In the following discussion, a general description of apparatuses and methods according to various embodiments of the present disclosure is provided, followed by a discussion of the operation of the same. Embodiments of the present disclosure relate to a portable racking system suitable for typical draw-out power circuit breakers. More specifically, disclosed herein are novel approaches to facilitating the remote racking of draw-out power circuit breakers via a portable electrically driven racking device that may be easily affixed to a circuit breaker without the need of permanently modifying the circuit breaker or its enclosure. The portable racking device may be small enough to be stored and/or transported in a hand-held carrying case.

Figure 1A:
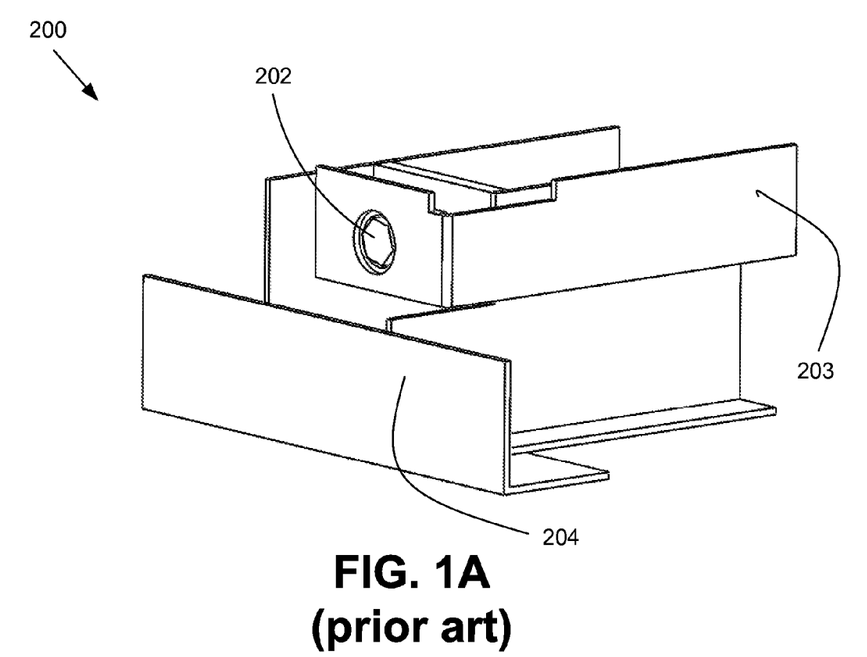
FIG. 1A depicts a drawing of an example of a partial view of typical circuit breaker racking assembly, shown in the normal position, according to various embodiments of the present disclosure.
Figure 1B:
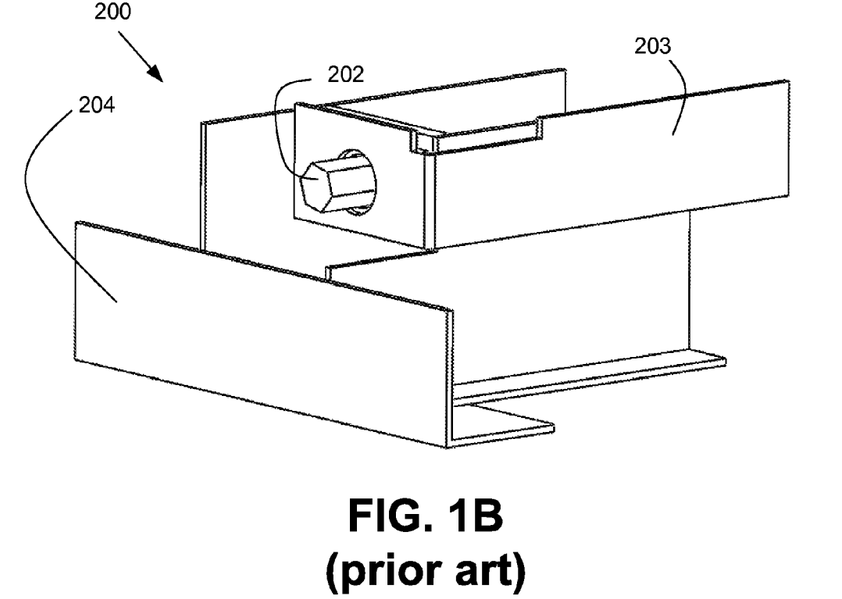
FIG. 1B depicts a drawing of an example of a partial view of the typical circuit breaker racking assembly of FIG. 1A, shown in the racking position, according to various embodiments of the present disclosure.

Referring now to FIGS. 1A and 1B, shown are drawings of non-limiting examples of a draw-out circuit breaker racking assembly 200. Specifically, FIG. 1A illustrates a drawing of a partial view of a draw-out circuit breaker racking assembly 200. The draw-out circuit breaker racking assembly 200, as will be appreciated by one skilled in the art, is generally included as a portion of a circuit breaker assembly (not shown). The draw-out circuit breaker racking assembly 200 comprises a racking screw engagement nut 202, a sliding breaker interlock 203, and a breaker racking assembly support angle 204.

FIG. 1B is a drawing of a partial view of the circuit breaker racking assembly 200 in the proper position for racking a circuit breaker on and/or off the bus. The sliding breaker interlock 203 has been pushed back to ensure that the circuit breaker is 'open' through an interlock mechanism in the circuit breaker (not shown) and the racking screw engagement nut 202 is accessible. It should be noted that while FIGS. 1A and 1B illustrate views of a typical draw-out circuit breaker racking assembly 200, the portable racking device 100 of the present disclosure may be applicable to many other types of draw-out circuit breakers.

Figure 2:
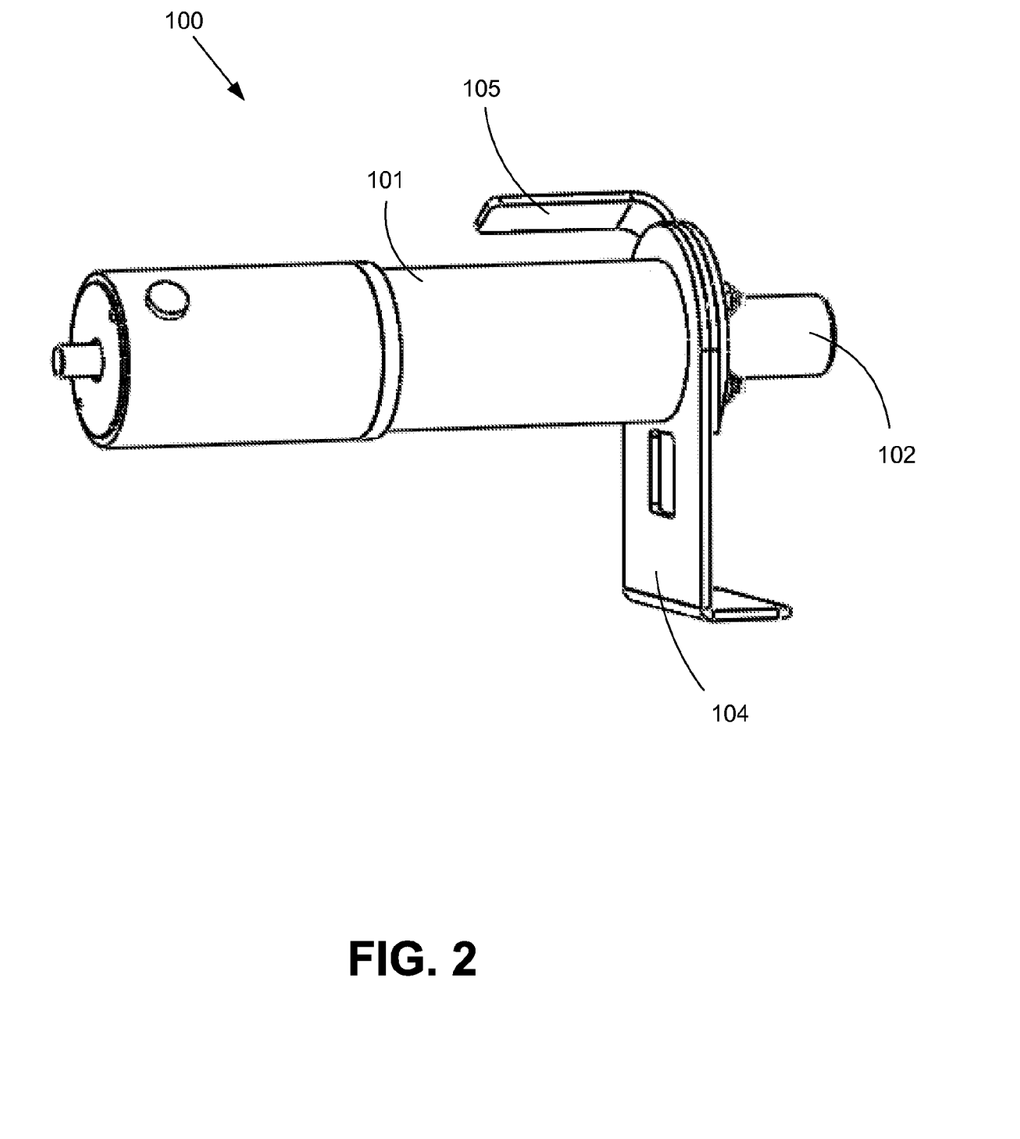
FIG. 2 depicts a drawing of an example of a portable racking device suitable for use with the circuit breaker racking assembly of FIGS. 1A and 1B, according to various embodiments of the present disclosure.
Figure 7:
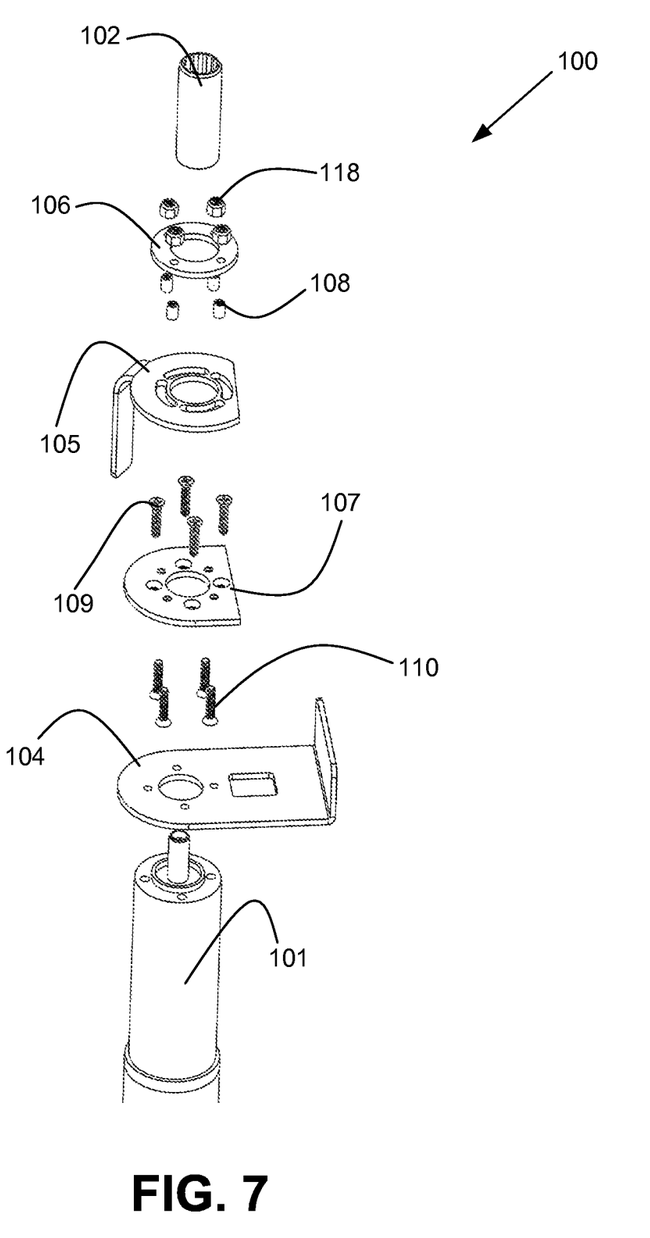
FIG. 7 is an exploded-view of the portable racking device of FIG. 2, according to various embodiments of the present disclosure.
Figure 8:
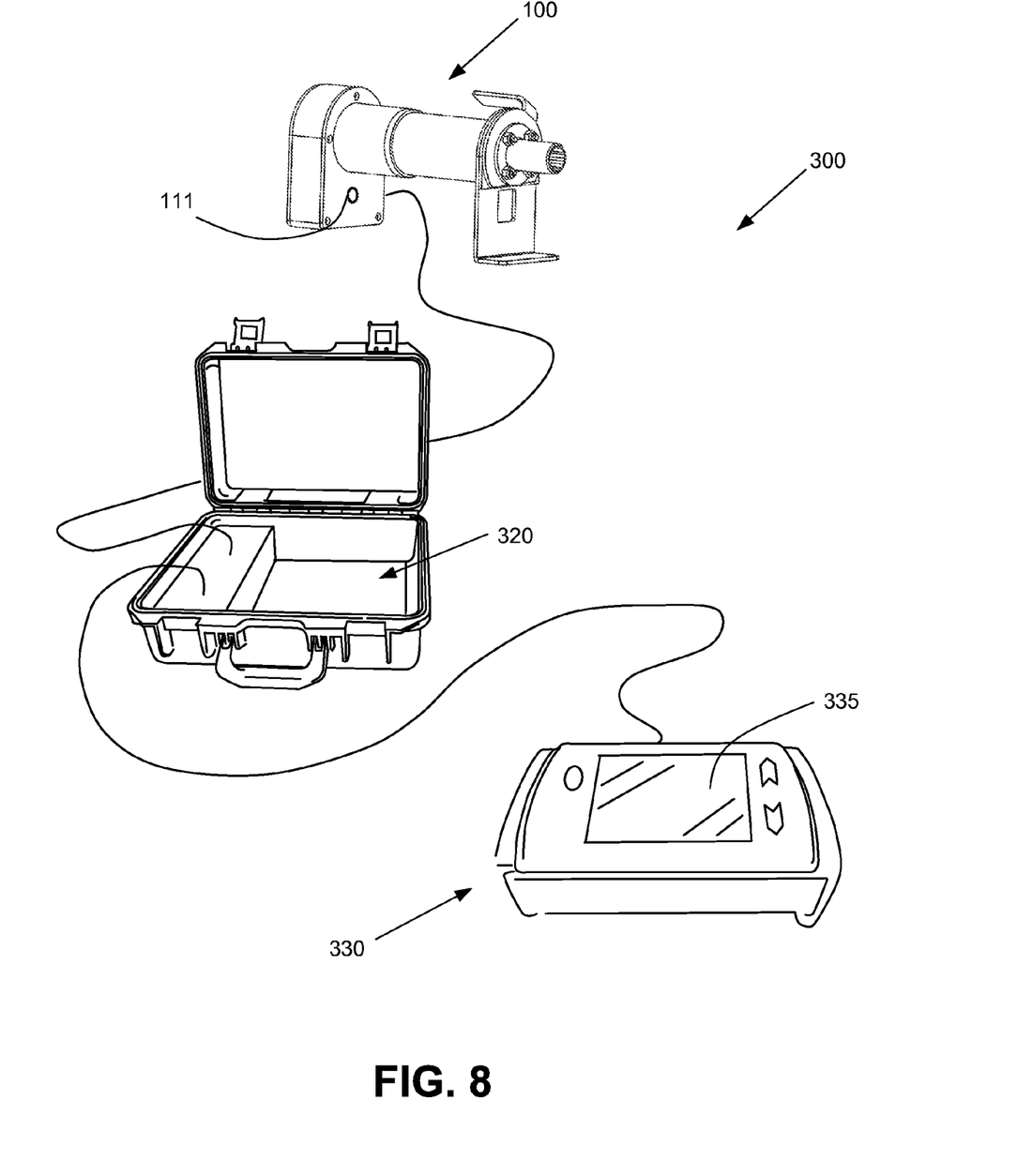
FIG. 8 depicts a drawing of an example of a portable remote racking system including the portable racking device of FIG. 2 according to various embodiments of the present disclosure.

Referring now to FIG. 2, shown is a drawing of a non-limiting example of a portable racking device 100 suitable for attaching to a draw-out circuit breaker racking assembly 200, according to various embodiments of the present disclosure. The portable racking device 100 comprises a gearmotor 101, a drive socket 102, an anti-rotation angle 104, a locking disk 105, a retaining disk 106 (FIG. 7), and a spacer plate 107 (FIG. 7). The gearmotor 101 comprises a gear box coupled to a motor. The motor may comprise an alternating current motor, a brushed direct current motor, a brushless direct current motor, and/or any other suitable type of electrically driven motor. The gearmotor 101 may be powered via a power supply 320 (FIG. 8). In some embodiments, the power supply 320 is internal to the portable racking device 100. In other embodiments, the power supply 320 is external to the portable racking device as shown in FIG. 8. The gearmotor 101 may further comprise a motor sensor and motor control circuitry necessary to run the motor of the gearmotor 100 bi-directionally while monitoring the output torque of the gearmotor 101. In addition, the circuitry may further monitor the number of turns of the racking screw of the draw-out circuit breaker racking assembly 200 for determining the position of the breaker when the portable racking device 100 is engaged with the draw-out circuit breaker racking assembly 200. Information transmitted to the control device 330 may be used to determine motor current measurement as a function of torque or current. In addition, the distance and direction that the circuit breaker moves at a given time may be determined as a function of revolutions of the racking nut. Motor stall may also be determined from this information.

Figure 3A:
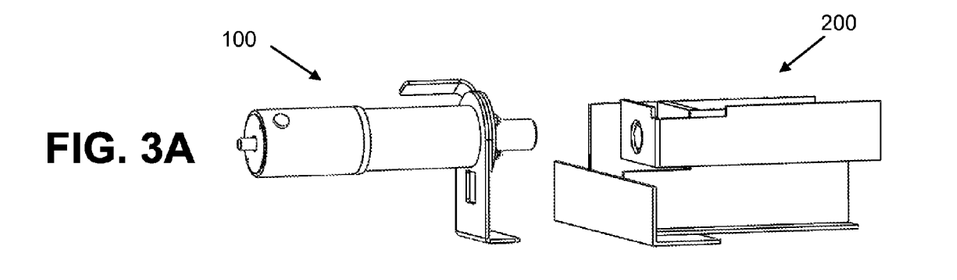
FIGS. 3A, 3B, 3C, and 3D depict the process of engaging the portable racking device of FIG. 2B with the circuit breaker racking assembly of FIGS. 1A-1B.
Figure 3B:
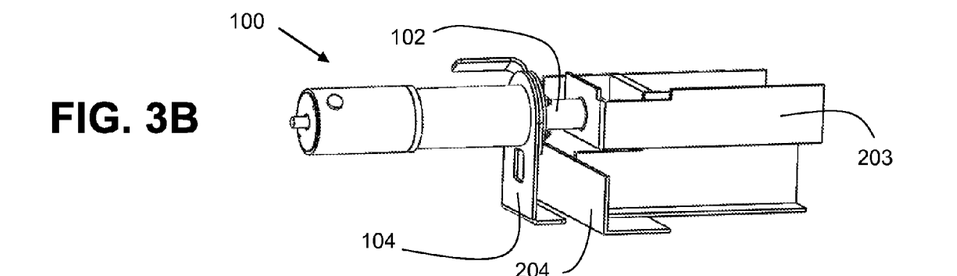
Figure 3C:
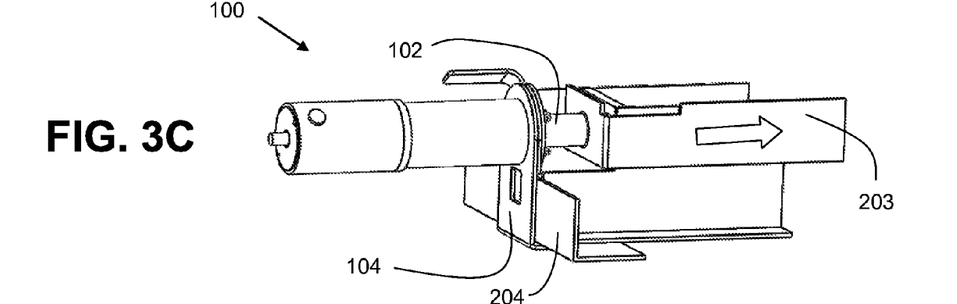

Referring to FIG. 3C, the drive socket 102 is coupled to the output shaft extending from the gearmotor 101 and may be aligned with the hole in the sliding breaker interlock 203 of the draw-out circuit breaker racking assembly 200. The drive socket 102 may be used to move the sliding breaker interlock 203 and engage with the racking screw engagement nut 202 (FIG. 1B) of the draw-out circuit breaker racking assembly 200 such that rotation of the drive socket 102 rotates the racking screw engagement nut 202.

Figure 5:
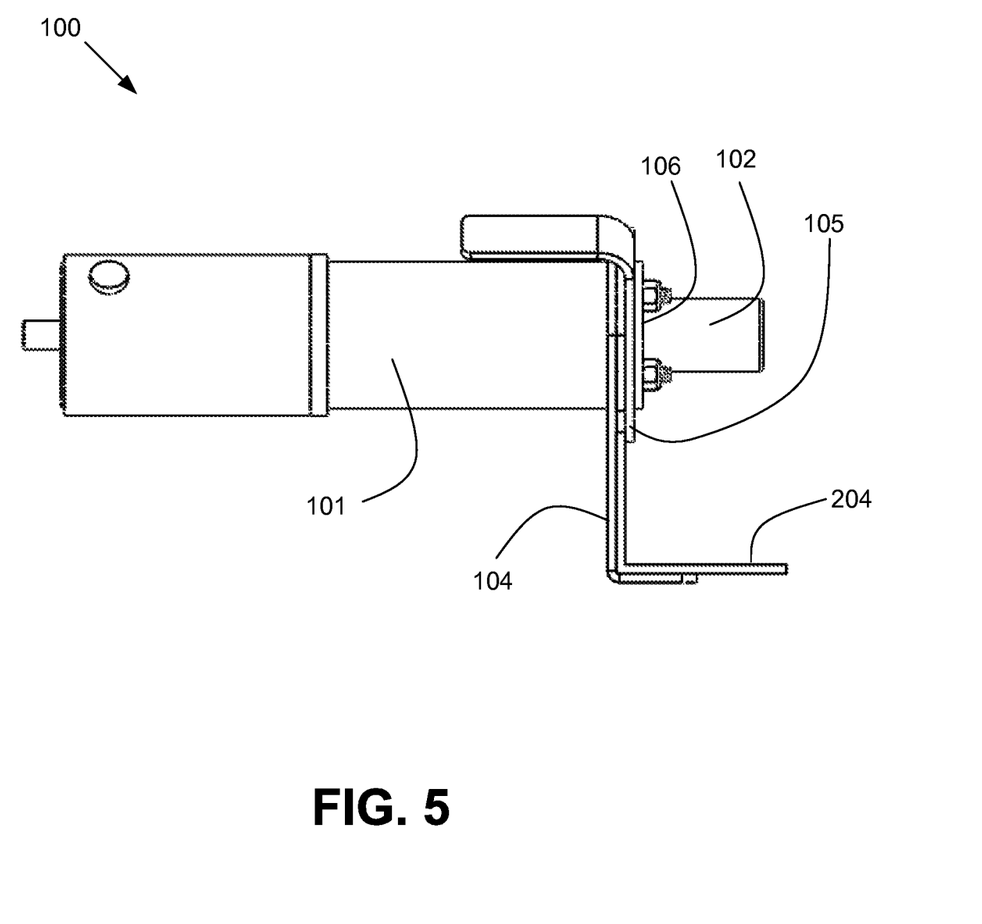
FIG. 5 is a side view of the portable racking device of FIG. 2 attached to the circuit breaker racking assembly of FIGS. 1A-1B.

As shown in FIG. 5C, the anti-rotation angle 104 may comprise an angled bracket having a primary hole sized to engage with the drive socket 102 that is coupled to the output shaft of the gearmotor 101. The anti-rotation angle 104 is placed between the locking disk 105 and the gearmotor 101. The anti-rotation angle 104 extends downwardly from the gearmotor 101 and is configured to engage with the breaker racking assembly support angle 204 of the draw-out circuit breaker racking assembly 200.

As shown in FIG. 7, the locking disk 105 comprises a plate having a primary hole and a plurality of semi-circle apertures disposed in a circular configuration substantially surrounding the primary hole. The locking disk 105 may further comprise a handle extending outwardly from the plate. The primary hole of the locking disk 105 is sized to receive the drive socket 102 engaged with the output shaft of the gearmotor 101. The locking disk 105 is disposed between the spacer plate 107 and the retaining disk 106. As discussed with respect to FIG. 7, the locking disk 105 may be rotated about the axis of the output shaft and drive socket 102 to lock and unlock the portable racking device 100 to and/or from the circuit breaker racking assembly 200. For example, when the portable racking device 100 is engaged with the circuit breaker racking assembly 200, the locking disk 105 may be rotated to engage the back side of the breaker racking assembly support angle 204 of the circuit breaker racking assembly 200, thereby holding the portable racking device 100 in place. When the portable racking device 100 is to be removed from the circuit breaker racking assembly 200, the locking disk 105 may be rotated in the opposite direction so that the locking disk 105 no longer engages with the back side of the breaker racking assembly support angle 204 allowing the portable racking device 100 to be removed from the circuit breaker racking assembly support angle 204.

In some embodiments, the portable racking device 100 may comprise a video camera 111 (FIG. 8) that obtains images and transmits the images for rendering on a video display 335 (FIG. 8) contained in a remote hand-held control device 330 (FIG. 8). The images rendered on the video display 335 allow a human operator to visually monitor the position and progress of the breaker while it is being racked.

Figure 3D:
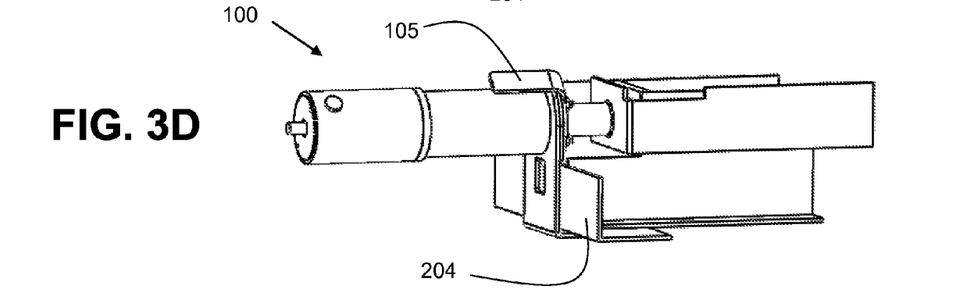

Moving on to FIGS. 3A-3D, shown are drawings of non-limiting examples of the portable racking device 100 in various stages of installation with the circuit breaker racking assembly 200 according to various embodiments of the present disclosure. With reference to FIG. 3A, shown is the portable racking device 100 detached from the circuit breaker racking assembly 200. FIG. 3B illustrates a drawing of an example of the portable racking device 100 being aligned to engage with the circuit breaker racking assembly 200. As shown in FIG. 3B, the drive socket 102 of the portable racking device 100 is aligned with a hole in the sliding breaker interlock 203 of the circuit breaker racking assembly 200. The diameter of the hole in the sliding breaker interlock 203 is smaller than the diameter of the drive socket 102. As depicted in FIG. 3C the drive socket 102 of the portable racking device 100 is pushed against the sliding breaker interlock 203, displacing the sliding breaker interlock 203 in the direction of the arrow. As the sliding breaker interlock 203 is moved, the racking screw engagement nut 202 shown in FIG. 1B is exposed, and the portable racking device 100 becomes engaged with the circuit breaker racking assembly 200. Referring next to FIG. 3D, shown is a drawing of an example of the portable racking device 100 fully engaged with the circuit breaker racking assembly 200. The handle of the locking disk 105 of the portable racking device 100 has been rotated to latch the portable racking device 100 in place by overlapping a portion of the locking disk over a portion of the circuit breaker racking assembly support angle 204.

Figure 4A:
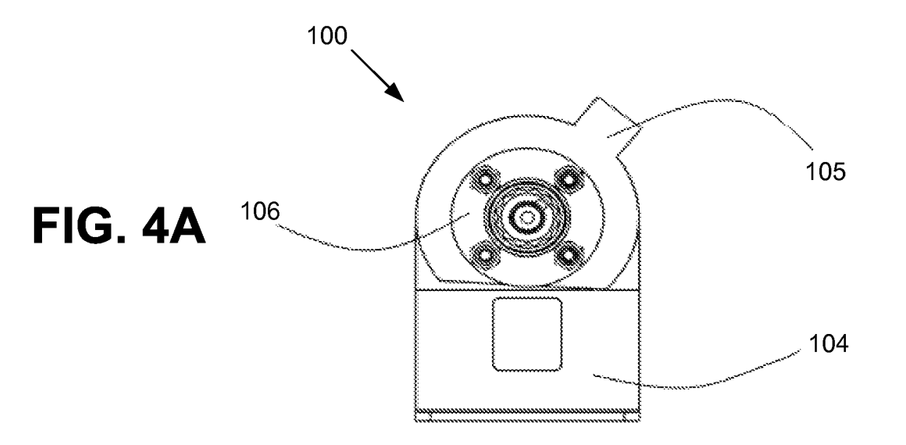
FIG. 4A is a drawing of an example of a front-view of the portable racking device of FIG. 2 with the locking disk in the unlocked position, according to various embodiments of the present disclosure.
Figure 4B:
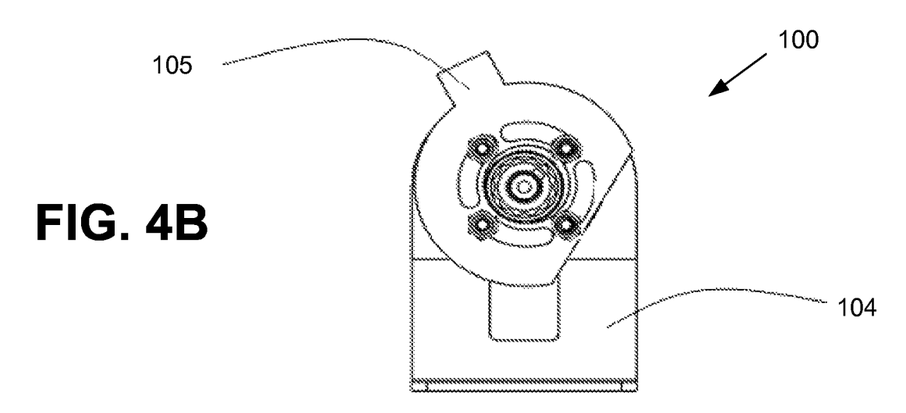
FIG. 4B is a drawing of an example of a front-view of the portable racking device of FIG. 3 with the locking disk in the locked position and the retaining disk removed, according to various embodiments of the present disclosure.

To further explain the operation of the portable racking device 100, FIG. 4A illustrates a drawing of an example of a socket-end view of the portable racking device 100, shown with the locking disk 105 in the 'unlatched' position. FIG. 4B illustrates a drawing of an example of the socket-end view of the portable racking device 100 with the locking disk 105, shown in the 'latched' position. FIG. 4B is shown without retaining disk 106 that is shown in FIG. 4A, to clarify the movement of the locking disk 105. As can be appreciated, the plurality of semi-circular apertures may act as a guide about the screws such that the length of the semi-circular apertures limit the distance of rotation of the locking disk about the portable racking device 100.

Turning now to FIG. 5, shown is a drawing of an example of a side view of the portable racking device 100 in the 'latched' position according to various embodiments of the present disclosure. For the sake of clarity, only the circuit breaker racking assembly support angle 204 of the circuit breaker racking assembly 200 is shown. Once the vertical flange of the anti-rotation angle 104 is in contact with the vertical flange of the circuit breaker racking assembly support angle 204, the locking disk 105 is rotated to engage the back side of the circuit breaker racking assembly support angle 204, thereby holding the portable racking device 100 in place. As such, the locking disk 105 secures the portable racking device 100 to the circuit breaker racking assembly support angle 204 of the circuit breaker racking assembly 200, and the anti-rotation angle 104 of the portable racking device 100 engages the circuit breaker racking assembly support angle 204.

Figure 6A:
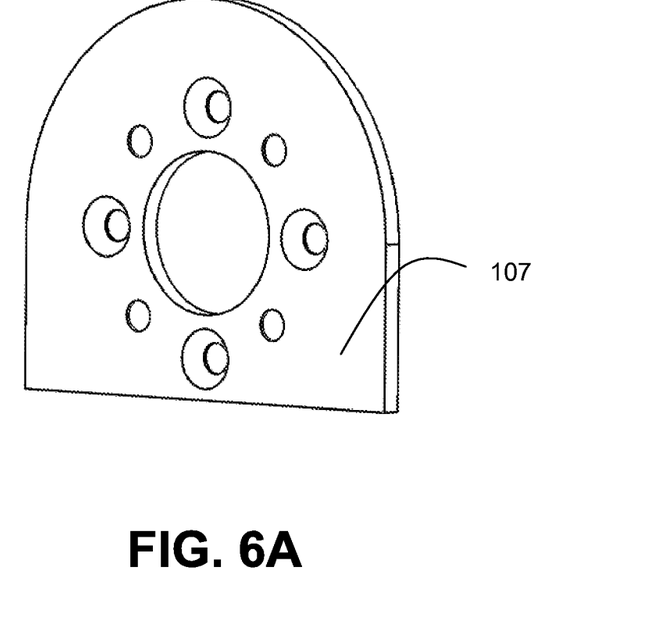
FIG. 6A depicts a drawing of an example of side A of the spacer plate component of the portable racking device of FIG. 2, according to various embodiments of the present disclosure.
Figure 6B:
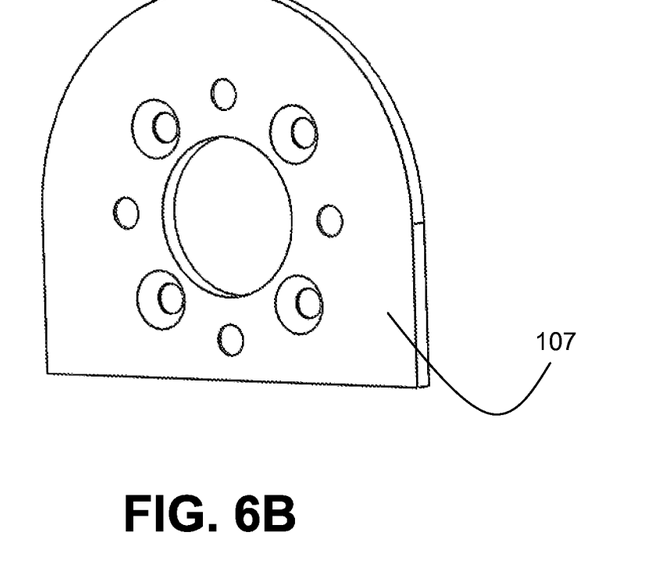
FIG. 6B depicts a drawing of an example of side B of the spacer plate component of the portable racking device of FIG. 2, according to various embodiments of the present disclosure.

To further explain the construction of the portable racking device 100, FIG. 7 illustrates a drawing of an example of an exploded view of the portable racking device 100 according to various embodiments of the present disclosure. Four countersunk screws 109 may pass through a spacer plate 107 (FIGS. 6A and 6B) and the anti-rotation angle 104, into the end of the gearmotor 101. Four additional countersunk head screws 110 pass through the spacer plate 107, the locking disk 105, the four spacers 108, and the retaining disk 106 and are held in place by four locknuts 118. The locking disk 105 is free to rotate about the axis of the shaft extending form the gearmotor 101 on the spacers 108. FIG. 6A depicts one side of the spacer plate 107. FIG. 6B depicts the opposite side of the spacer plate 107. The drive socket 102 may passes through the primary hole in the centers of the anti-rotation angle 104, the spacer plate 107, the locking disk 105, and the retaining disk 106 and is mated with output shaft of the gearmotor 101.

Turning now to FIG. 8, shown is a drawing of an example of a portable racking system 300 including the portable racking device 100, according to various embodiments of the present disclosure. The portable racking system 300 may comprise the portable racking device 100, the power supply 320 and the control device 330. The portable racking device 100 is equipped with a video camera 111. The image from the video camera 111 may be displayed on the video display 335 located in the handheld control device 330. In addition, the operator may control the portable racking device 100 via the handheld control device 330 as may be appreciated by those skilled in the art. The video display 335 may be used to display the motor current measurement value of the portable racking device as a function of torque and/or current.

Figure 9:
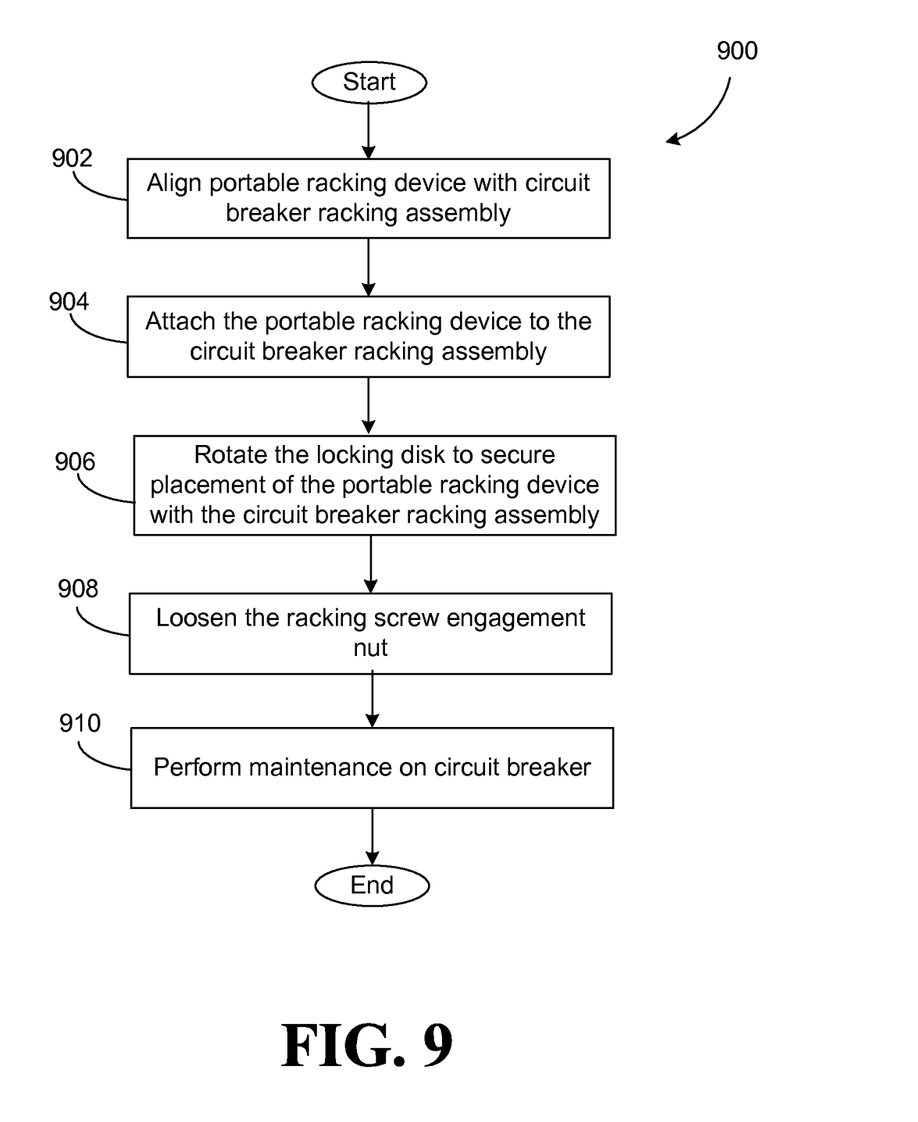
FIG. 9 is a flowchart illustrating a method of installing the portable racking device of FIG. 2 to the circuit breaker racking assembly of FIGS. 1A-1B according to various embodiments of the present disclosure.

With reference to FIG. 9, shown is a flowchart that provides a non-limiting example of a method 900 of various embodiments of the present disclosure. It is understood that the flowchart of FIG. 9 merely provides examples of the many different types of functional arrangements that may be employed to implement the operation of the methods as described herein.

At reference numeral 902, the portable racking device 100 is aligned with the circuit breaker racking assembly 200 of a circuit breaker prior to attaching. At reference numeral 904, the portable racking device 100 pushes the sliding breaker interlock 203 of the circuit breaker racking assembly 200 to expose the racking screw engagement nut 202. As the racking screw engagement nut 202 is exposed, the drive socket 102 engages with the racking screw engagement nut 202 and the bottom portion of the anti-rotation angle 104 engages with the bottom portion of the circuit breaker racking assembly support angle 204. At reference numeral 906, the locking disk 105 is rotated to secure placement of the portable racking device 100 with the circuit breaker racking assembly 200. At reference numeral 908, the gearmotor 101 is activated to rotate the racking screw engagement nut 202. At reference numeral 910, maintenance is performed on the circuit breaker.

Although the flowchart of FIG. 9 shows a specific order of execution, it is understood that the order of execution may differ from that which is depicted. For example, the order of execution of two or more steps may be scrambled relative to the order shown. Also, two or more steps shown in succession in FIG. 9 may be executed concurrently or with partial concurrence. Further, in some embodiments, one or more of the steps shown in FIG. 9 may be skipped or omitted.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:
1. A portable racking device, comprising:
   a gearmotor comprising a gear box coupled to a motor;
   a drive socket coupled to an output shaft of the gearmotor, the drive socket sized to engage with a racking screw of a circuit breaker racking assembly;
   an angled bracket coupled to the gearmotor, the drive socket situated within a hole of a first member of the angled bracket, and a second member of the angled bracket configured to engage with a support angle of the circuit breaker racking assembly; and a locking disk moveably attached to the gearmotor, the angled bracket being disposed between the locking disk and the gearmotor, and the locking disk moveable about an axis of the output shaft of the gearmotor.

2. The portable racking device of claim 1, further comprising a power supply coupled to the gearmotor.

3. The portable racking device of claim 1, wherein the locking disk is shaped such that, when the portable racking device is engaged with the circuit breaker racking assembly, a portion of the locking disk overlaps a portion of the support angle of the circuit breaker racking assembly in response to rotation of the locking disk to a locking position.

4. The portable racking device of claim 1, wherein the motor comprises one of an alternating current motor, a brushed direct current motor, or a brushless direct current motor.

5. The portable racking device of claim 1, further comprising a spacer disk situated between the locking disk and the angled bracket and coupled to the gearmotor.

6. The portable racking device of claim 1, further comprising a video camera, the video camera configured to transmit a plurality of images to a control device for rendering on a video display of the control device.

7. A racking device system, comprising:
   a portable racking device detachably attached to a circuit breaker racking assembly of a circuit breaker, the portable racking device comprising:
      a gearmotor;
      a drive socket coupled to an output shaft of the gearmotor, the drive socket being engaged with a racking nut of the circuit breaker racking assembly; and
      a locking disk moveably attached to the gearmotor and situated in a locked position, a portion of the locking disk overlapping a circuit breaker racking assembly support angle of the circuit breaker racking assembly; and
   a control device in data communication with the portable racking device.

8. The racking device system of claim 7, wherein the portable racking device further comprises an angled bracket attached to the gearmotor, the angled bracket being situated between the locking disk and an output end of the gearmotor.

9. The racking device system of claim 8, wherein the angled bracket engages with a bottom portion of the circuit breaker racking assembly support angle.

10. The racking device system of claim 8, wherein the portable racking device further comprises a spacer disk situated between the angled bracket and the locking disk.

11. The racking device system of claim 7, wherein the locking disk comprises a primary hole and a plurality of semi-circular tracks surrounding the primary hole, the output shaft of the gearmotor extending outwardly through the primary hole and a portion of the drive socket being situated within the primary hole.

12. The racking device system of claim 11, wherein the locking disk is moveably attached to the gearmotor via a plurality of screws extending through the spacer disk and the plurality of semi-circular tracks.

13. The racking device system of claim 7, wherein the portable racking device comprises a camera.

14. The racking device system of claim 7, wherein the portion of the locking disk does not overlap any portion of the circuit breaker racking assembly support angle when the locking disk is rotated to an unlocked position.

15. The racking device system of claim 7, wherein the gearmotor comprises a motor sensor, the motor sensor being in data communication with a motor controller on the control device, the motor sensor being configured to transmit an amount of torque being applied to the circuit breaker racking assembly via the portable racking device.

16. The racking device system of claim 7, wherein the control device comprises a video display, and the video display is configured to display a circuit breaker position indicator relating to a distance.

17. A method of remotely racking a circuit breaker, the method comprising:
   aligning a drive socket of a portable racking device with a circuit breaker racking assembly of the circuit breaker;
   pushing a sliding breaker interlock of the circuit breaker racking assembly to expose a racking screw of the circuit breaker racking assembly;
   engaging the drive socket of the portable racking device with the racking screw; and
   securing the portable racking device to a support angle of the circuit breaker racking assembly.

18. The method of claim 17, further comprising removing the racking screw via the drive socket by rotating the drive socket via a motor of the portable racking device.

19. The method of claim 17, wherein securing the portable racking device to the support angle further comprises rotating a locking disk of the portable racking disk in a direction to overlap a portion of the locking disk over the support angle of the circuit breaker racking assembly.

20. The method of claim 19, further comprising removing the portable racking device from the circuit breaker racking assembly by rotating the locking disk in an opposite direction until the locking disk disengages with the support angle of the circuit breaker racking assembly.

\* \* \* \* \*